(12) United States Patent
Streit

(10) Patent No.: US 6,398,169 B1
(45) Date of Patent: Jun. 4, 2002

(54) DEVICE FOR SECURING LONGITUDINAL ELEMENTS ON A PANEL AND TOOL FOR INSTALLING THE SAME

(75) Inventor: Bernard Streit, Anteuil (FR)

(73) Assignee: Sofanou S.A., Clerval (FR)

( * ) Notice: Subject to any disclaimer, the term of this patent is extended or adjusted under 35 U.S.C. 154(b) by 0 days.

(21) Appl. No.: 09/677,272

(22) Filed: Oct. 2, 2000

(30) Foreign Application Priority Data

Apr. 3, 1998 (FR) .............................. 98 04403

(51) Int. Cl.⁷ .................... F16B 15/00; F16B 45/00
(52) U.S. Cl. ............................... 248/71; 248/73
(58) Field of Search ................... 248/71, 73, 74.1, 248/74.2, 74.3, 62, 68.1; 227/120

(56) References Cited

U.S. PATENT DOCUMENTS

| | | | | |
|---|---|---|---|---|
| 2,904,294 A | * | 9/1959 | Marygold | 248/74.4 |
| 4,371,137 A | * | 2/1983 | Anscher | 248/73 |
| 4,609,170 A | * | 9/1986 | Schnabl | 248/71 |
| 4,709,842 A | | 12/1987 | Bengt | |
| 4,733,460 A | * | 3/1988 | Auger | 29/811 |
| 4,801,061 A | * | 1/1989 | Mangone, Jr. | 227/120 |
| 4,840,334 A | * | 6/1989 | Kikuchi | 248/73 |
| 5,039,040 A | * | 8/1991 | Idjakiren | 248/73 |
| 5,131,613 A | | 7/1992 | Haruhisa et al. | |
| 5,704,573 A | * | 1/1998 | De Beers et al. | 248/73 |
| 6,076,781 A | * | 6/2000 | Kraus | 248/73 |

FOREIGN PATENT DOCUMENTS

| | | |
|---|---|---|
| DE | 20 59 710 | 6/1972 |
| FR | 1 123 839 | 9/1956 |
| FR | 2 492 952 | 4/1982 |
| GB | 2 062 803 | 5/1981 |

* cited by examiner

*Primary Examiner*—Leslie A. Braun
*Assistant Examiner*—Gwendolyn Baxter
(74) *Attorney, Agent, or Firm*—Henderson & Sturm LLP (57) ABSTRACT

Installation device (4) for installing one or more longitudinally extending elements (2) on a panel. This device comprises a U-shaped retainer (1) to surround transversely the longitudinally extending elements (2), having flexible arms (20, 24) each provided with a series of notches (22,26). This device also comprise a base (30) having, corresponding to each arm, an inclined traversing passage (42) whose inlet opening (41) is located in the face opposite the retainer and show outlet opening (43) is located in the face opposite the retainer and whose outlet opening (43) is located in a lateral face of the base, each passage of the base (30) having a retaining hook (44) for the notch (22, 26) of the corresponding arm (20, 24) of the retainer, each flexible arm (20, 24) engaging in each corresponding inclined traversing passage (42) until the notches (22, 26) lock in the respective hooks (44) of the respective passages (42) to secure the longitudinally extending elements (2) to the base. This device further comprises a fastening mean (50) for securing the base in an opening in the panel on the face of the base opposite to that facing the retainer.

18 Claims, 8 Drawing Sheets

DEVICE FOR SECURING LONGITUDINAL ELEMENTS ON A PANEL AND TOOL FOR INSTALLING THE SAME

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates to a device for installing one or more cylindrical longitudinally extending elements on a panel, for example electrical wires and/or electrical cables and/or sheathing of the said wires or cables on a vehicle panel. More specifically, this invention relates to a device designed to bind and clamp together a plurality of wires or cables and to position and maintain the latter in a defined position on this panel. The present invention also relates to a tool for mounting such a device on a bundle of electrical wires or cables or on one or more longitudinally extending elements.

2. Description of the Prior Art

The documents U.S. Pat. No. 5,131,613 or GM 94 01 448 for example describe a device in the form of a harness that can be wound transversely around cables to be combined, and one end of which is designed so that it can engage in a coupling head provided in the other end. This head comprises an internal coupling tongue that engages in a notch in a series of notches provided in the free end of the harness so as to ensure a clamping of the cables or bundle of electrical wires irrespective of their diameter. This harness also includes, at the head or in the proximity thereof, a fastening means shaped so as to be able to be inserted and engage in an opening previously provided in the panel, thereby securing the harness and the bundle to the said panel.

However, the installation of a plurality of such harnesses at regular intervals along a bundle is complicated and time-consuming. Furthermore, it is normally recommended to cut the surplus end of the harness projecting beyond the coupling head, which on the one hand means wasting unused material, and on the other hand runs the risk of leaving sharp exposed edges on the new end. In addition, it is time-consuming to cut off the unused material and also involves the use of cutting tools in a workshop.

Documents U.S. Pat. No. 5,189,766, U.S. Pat. No. 5,223,675 or EP 0 433 621 for example also describe U-shaped retainer type cable installation devices that envelop the cables and in which the ends of each arm terminate in a hook. The hooks are designed so as to engage in a pair of openings or windows previously made in the panel. The retainer according to document EP 433 621 has a plurality of coupling notches on each of the arms, enabling a plurality of electrical wires or cables of different diameters to be clamped.

However, the use of these cable retainers is also complicated by the fact that it is advisable to keep the bundle of cables clamped against the panel between the two windows before the said retainers can be installed. Moreover, the dimensions of the openings or windows in the panel should be extremely accurate so as to permit on the one hand a smooth engagement of each arm end hook during the installation, and on the other hand ensure a reliable permanent retention of these hooks. In addition this type of device can only be installed when the panel is present since it is impossible to run the cable bundle through when the retainers are in place.

Besides, it is found that the securement of these devices on a panel is often unsatisfactory since it leads to a certain amount of undesirable play, particularly in the longitudinal direction of the wires, which means that the general positioning of the bundle may become imprecise as a result of subsequent vibrations.

BRIEF SUMMARY OF THE INVENTION

The object of the present invention is an installation device that is easier to mount on electrical wires or electrical cables, or even on a sheathing of the said wires or cables with the possibility of clamping the latter, and that is also easier to secure on a panel and will remain securely and reliably in place over the course of time. In addition the installation device should be able to be mounted on the cable bundles before being transported to an assembly line.

The structure of this device should also enable it to be mass produced so as to reduce production costs, in particular by pressure injection of plastics material into a mould.

As far as possible the design of this device should also permit its use and implementation by means of a tool actuated manually but also capable of being actuated pneumatically or electrically in order to improve ease of use, this being achieved by reducing material lost in cutting surplus material and thus in generating costly waste, and reducing the use of cutting tools in the workshop. The implementation time should thus be able to be reduced to a minimum.

These objects are achieved by virtue of the fact the installation device for installing one or more longitudinally extending elements on a panel comprises:

- a U-shaped retainer, each flexible arm of which has a series of externally oriented notches,
- and a base having, corresponding to each arm, an inclined traversing passage whose inlet opening is located in the face opposite the retainer and whose outlet opening is located in a lateral face of the base, the face of the base opposite to that facing the retainer being provided with a fastening means for securing the base in an opening in the panel.

One of the main advantages of the device is that the dimensions and positions of the inclined passages of the base are designed and manufactured accurately, which facilitates the insertion of the arms of the retainer. Moreover, these passages guide the ends of the arms in an inclined manner so that they come to rest against the panel at the edge of the opening, thereby assisting the seating of the device. The external orientation of the notches prevents any undesirable interference in the wires or cables in the vicinity of the coupling of the retainer in the base, and prevents any harmful contact on the panel after the fastening means has been inserted into the opening.

Preferably, the retainer is initially joined to the base by means of weak rupture points.

The device may thus be produced and marketed in one piece, which facilitates its manufacture, intermediate storage and handling up to its use at the time of installation of a cable on a panel.

The inlet opening of each passage of the base preferably has a retention hook for the notch of the corresponding arm of the retainer.

The coupling of the retainer thus takes place in a very controlled manner in the region of the face opposite the base, and not in the region of the lateral face where it could all too easily become dislodged, for example as the result of rubbing of the arm against the panel. This significantly improves the long-term reliability of the installation device.

Preferably the retainer has on each side of the longitudinally extending element to be installed a pair of arms with notches oriented externally in the direction of the said longitudinally extending elements.

By virtue of the orientation of the notches in the longitudinal direction of the wires or cables to be held, the risk of interference of the latter with the coupling of the arms of the retainer in the base is reduced still further. In addition, the ends of the arms that come into contact with the panel produce a particularly stable, four-point seating for the overall device.

If desired, the fastening means may be engaged in a detachable manner in the base.

The fastening means for securing the base in an opening in the panel is conveniently in the form of a central pin provided with slanting tongues oriented towards the base. These tongues may be distributed in the form of several, preferably three or four, longitudinal series distributed uniformly around the periphery of the pin. Alternatively, each tongue may completely surround the pin.

This type of fastening means can easily engage in an opening provided in the panel whose diameter is greater than that of the pin, the width of the tongues ensuring a reliable coupling. The plurality of tongues enables any imprecisions of positioning, either of the device on the bundle or of the openings in the panel, to be corrected. This type of fastening also compensates for any variation in thickness of the panel.

The base conveniently comprises, at its fastening junction, an elastic skirt curved in the direction of the fastening.

This skirt ensures that each of the tongues engaged behind the panel is properly tensioned in order thereby to hold the device firmly against the said panel.

A tool specially designed for mounting an installation device according to the invention on one or more longitudinally extending elements, such as a bundle of electrical cables or wires, may comprise:

a magazine enabling a plurality of devices to be stored, a transporting frame capable of being displaced by a first actuating device from a first position at the outlet of the magazine in order to transport the base of a device to a second position so as to bring the said device into the plane of a recess provided in the front edge of the tool, where the retainer of the said device is held in a manipulating unit situated at a first height, followed by return, a second actuating device enabling the operating unit to be raised perpendicularly to the base to a second height in order to separate the retainer from the base, then, once the longitudinally extending element or elements are present above the base in the front recess, enabling the operating unit to be lowered to a third height in order to insert the arms of the retainer above the longitudinally extending elements into their corresponding base passage, and then enabling the operating unit to be raised again to the first height in order to withdraw the base of the device from the transporting frame, the said device then being able to be disengaged from the operating unit.

On account of the fact that the installation device may be initially manufactured and manipulated in one piece, it is accordingly possible to envisage in practice a tool enabling this device to be arranged more easily above a bundle, and by employing electric, hydraulic, but preferably pneumatic power-driven actuating devices, to attach and secure this device without effort to the said bundle.

Advantageously, the first actuating device is a single-chamber pneumatic linear jack with a spring urging the piston at rest to a position corresponding to a reduction of the chamber and bringing the transporting frame integral with the end of the piston rod into its first position. This type of twin-position jack with return spring is found to be reliable in practice.

Advantageously, the second actuating device is a single-chamber pneumatic linear jack with a spring urging the piston at rest into a high position corresponding to a reduction of the chamber and bringing the operating unit integral with the end of the piston rod into a second position, this unit being held initially in the first position against the force of the spring by an electromechanical, magnetic, pneumatic or mechanical catch.

Thus, by virtue of the addition of a simple electromechanical jack, a reliable displacement of the manipulating unit into three different positions is ensured by means of a twin-position pneumatic jack with a return spring, which arrangement is recognised as being reliable.

Advantageously, the transporting frame is mounted on the end of the actuating device rod by means of a rotation pivot, and the duct within which the transporting frame is displaced has, starting from the magazine, a wide first part terminating in a lug that imparts to the frame containing a device, a rotation of a quarter of a turn, followed by a second part to guide the end of the rotation, which in turn is followed by a third channel for guiding the frame to the plane of the recess of the front face of the tool.

This arrangement enables the capacity of the magazine to be optimised by storing the installation devices side by side along a line perpendicular to their harness plane. Thus, by executing a quarter of a turn the transporting frame brings the device, by orienting its harness, into the plane of the recess of the tool.

According to a modification, the magazine opens out perpendicularly to the duct, where an installation device is gripped parallel to the plane of its retainer by the transporting frame and is displaced towards the recess by sliding movement of the transporting frame and of the device inside the duct. In this embodiment of the tool, the installation device executes a first translation in the magazine perpendicularly to the plane of its retainer, followed by a second translation in the duct parallel to the plane of the retainer.

Advantageously, the outlet opening of the magazine is provided with two oppositely facing electromechanical, magnetic, pneumatic or mechanical catches that engage in recesses of side faces of the device base so as to retain that device situated at the level of this opening when the transporting frame is outside its first position.

The release at a suitable moment of an installation device to the transporting frame as soon as it becomes empty can thus be controlled by simple electronic means or mechanical displacements.

Conveniently, the base of the recess of the tool is of convex triangular shape, the base of a device being brought to and positioned at the apex of the triangle by the transporting frame.

These inclined base faces of the recess effectively guide the harness branch ends projecting from the base outlet openings so as to assist their device seating function.

BRIEF DESCRIPTION OF THE SEVERAL VIEWS OF THE DRAWINGS

The invention will be understood more clearly by examining one embodiment, which however is to be regarded as in no way limiting, illustrated in the accompanying diagrams, in which.

DETAILED DESCRIPTION OF THE INVENTION

Figure 1A:
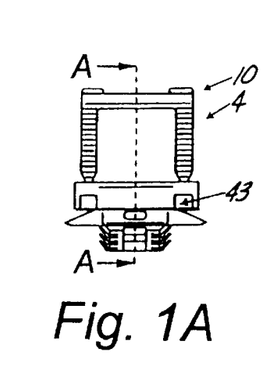
FIGS. 1A, 1B, 1C, 1D, 1E and 1F a respectively plan views from the front, side, above, below, in transverse section and in longitudinal section, of a fastening means according to the invention.
Figure 1B:
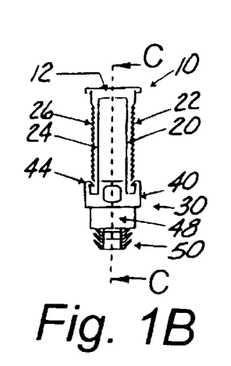
Figure 1C:
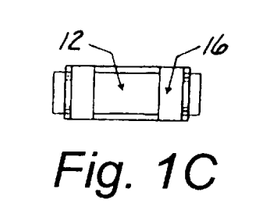
Figure 1D:
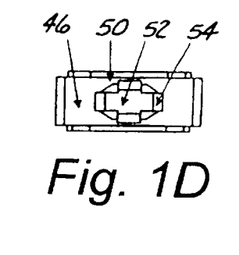
Figure 1E:
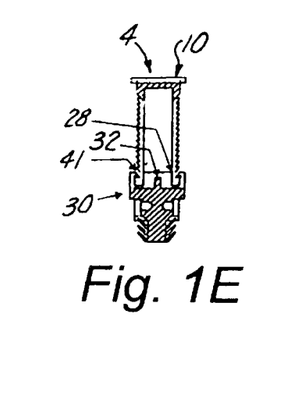
Figure 1F:
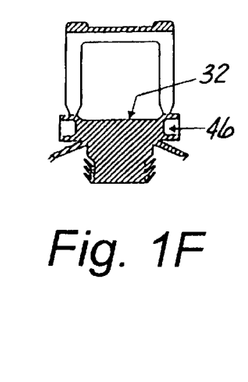
Figures 2A, 2B, 2C:
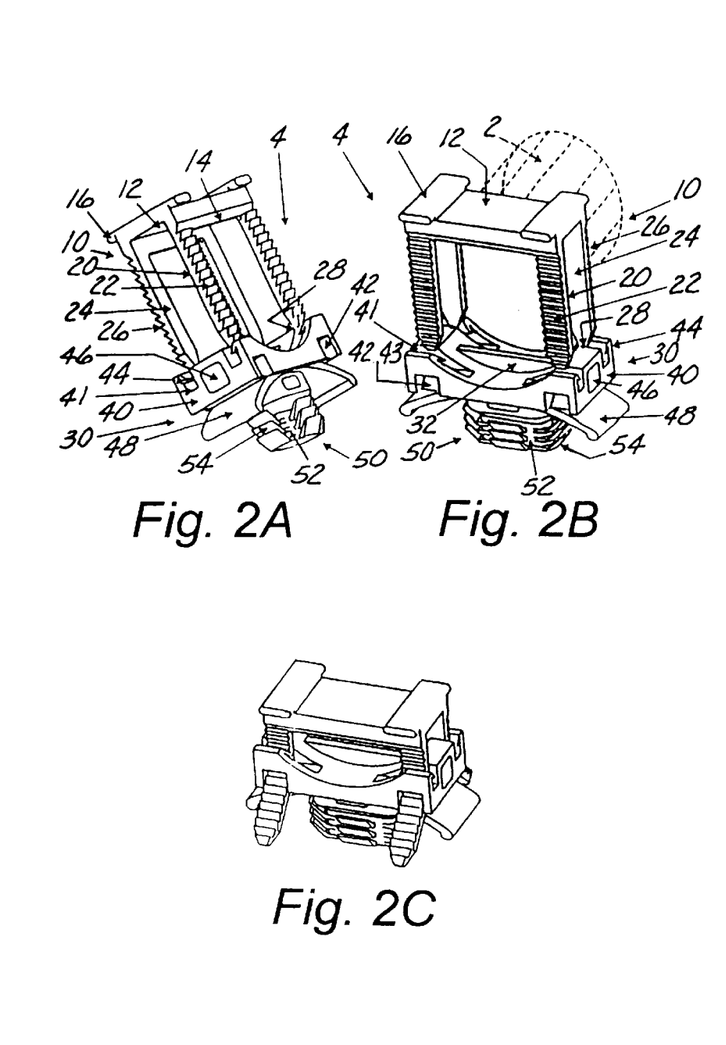
FIGS. 2A, 2B and 2C are perspective views of the fastening means of FIG. 1, respectively in the initial state from the side and below, in the initial state from the front and above, and in the mounted state from above.

FIGS. 1 and 2 show an installation device 4 for longitudinally extending elements 2, shown more clearly by the dotted lines in FIG. 2B. More particularly according to the invention, this installation device 4 comprises a retainer 10 designed to be inserted into a base 30 whose face opposite to that facing the retainer is provided with a fastening means 50 for engagement in an opening previously provided in a panel.

The retainer 10 is generally in the form of an inverted U and surrounds transversely the longitudinally extending elements 2, the retainer also comprising on both sides a pair of separate arms.

More specifically, the retainer 10 comprises an upper bridge 12 each lateral end of which is extended orthogonally downwards by a pair of arms, one being the so-called "front" arm 20 and the other the so-called "rear" arm 24. Each arm has a series of notches, respectively 22 for the front arm 20 and 26 for the rear arm 24, which according to the invention are oriented either outwardly or inwardly with respect to the retainer 10, specifically in the longitudinal direction of the elements 2 to be secured or perpendicularly to these elements, the notches 22 being oriented in the contrary direction to the notches 26.

FIGS. 1A–1F and 2A–2C illustrate an embodiment of the retainer in which the notches 22 and 26 are carried on the external faces of each of the arms. As can be seen in the figures, the notches are oriented outwardly with respect to the retainer and point parallel to the longitudinally extending elements 2. It is possible according to one variant to form the notches on the external section of each of the arms of the retainer. In this case the notches are oriented outwardly with respect to the retainer and point perpendicularly to the longitudinally extending elements.

It is also possible according to another variant to form the notches on the internal face on each arm of the retainer, in which case the notches are oriented inwardly and point parallel to the longitudinally extending elements, or even to form the notches on the internal sections of the arms, in which case they are oriented inwardly and point perpendicularly to the longitudinally extending elements.

The end of each arm 20, 24 in the direction of the base 30 has a conical contraction forming a type of point, this end being connected initially to the base 30 by a bridge of material forming a weak point of rupture 28.

The upper bridge 12 is of generally parallelepiped shape with its rectilinear lower edge 14 enabling, in conjunction with a central rectilinear groove 32 in the base, all types of longitudinally extending elements 2 to be secured, irrespective of their diameter.

Furthermore, the lateral ends of the upper face of the bridge 12 have respectively protuberances 16 that are more particularly designed to engage with a positioning tool member described hereinafter.

The base 30 comprises a plate 40 that is substantially parallelepiped in shape except for the upper face, opposite the retainer 10, in the concave cylindrical portion completed by the groove 32. The lower face of this plate 40 is extended by the fastening means 50.

The lateral faces of the plate 40 have respectively a central cavity 46 intended for retaining, in the opening of a magazine, an implementation tool of the device to be described hereinafter.

More specifically according to the invention, this plate 40 has, opposite each arm 20, 22 of the retainer 10, an inclined passage 42 whose inlet opening 41 is located in the upper face of the plate and whose outlet opening 43 appears in an original manner in a front vertical face end, respectively in front and behind.

As can be seen more clearly in FIG. 1B and FIGS. 2, each inlet opening 41 of the inclined passage 42 is provided with a hook 44 oriented inwardly with respect to the plate so as to engage firmly with one of the notches 22, 26 respectively of the arms 20, 26 of the retainer 10. Although a complementary notch engagement may of course be effected at the level of the upper edge of the outlet opening 43, this is only regarded as an accessory in the case of this device.

Provision is made to arrange the hook 44 on an edge of the inlet opening 41 opposite to that shown in the figures, when the notches are carried by the internal face of the flexible arms. Similarly, the hook 44 is arranged on one or other of the two side edges of the inlet opening 41 when the notches are carried respectively by one or other of the portions of the flexible arms.

The fastening means 50 for securing the base 30 to a panel is in the form of a central pin 52 provided with four vertical series of tongues 54 oriented upwardly, i.e. in the direction of the base, in combination with a curved skirt 48 situated at the intersection of the central pin 52 and the lower face of the plate 40, the said skirt being curved in the direction of the tongues 54.

Figure 7A:
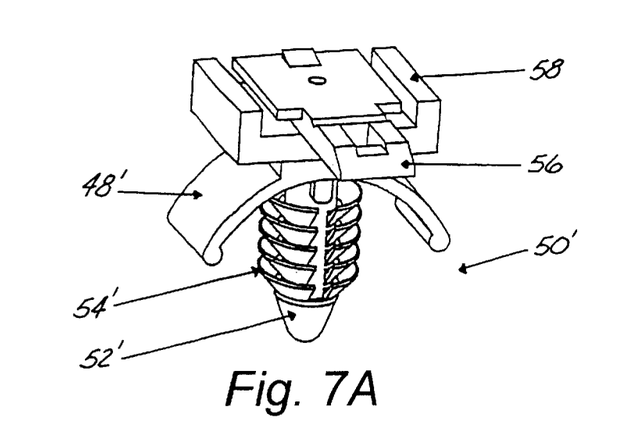
FIGS. 7A and 7B show two variants of detachable fastening means the base.
Figure 7B:
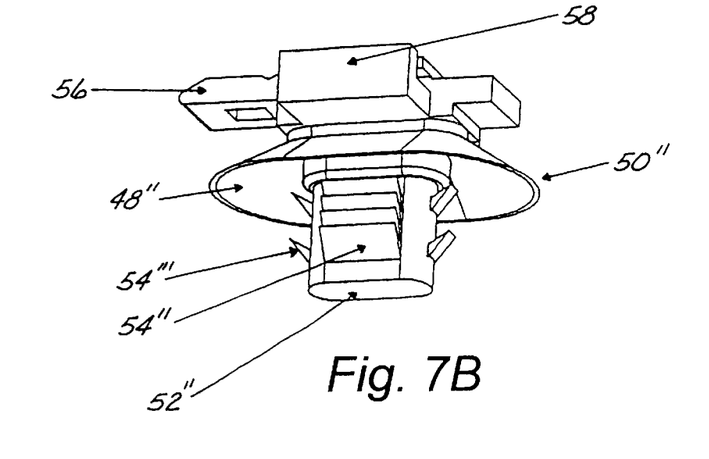

FIGS. 7A and 7B show two variants of fastening means 50' and 50" capable of being secured in a detachable manner by means of a flexible finger 56 associated with a frame 58 engaging in a slide (not shown) provided in the lower face of the base 30.

More particularly, the tongues 54' of the fastening means 50' each cover one half of the periphery of the pin 52'.

The curved skirt 48' is of rectangular shape with a very pronounced curvature towards the bottom.

According to another example of fastening means 50", the pin 52" has an oblong transverse section enabling on the one hand very wide tongues 54" to be arranged on the oblong faces, and some narrow tongues 54'" to be arranged on the side edges. The skirt 48" then has the shape of a longitudinal cupola bordering the hook opening of the device.

The aforedescribed fastening means is more particularly intended to be mounted on top of a bundle of longitudinally extending elements such as electrical wires or cables, by means of a tool as illustrated in FIGS. 3 to 6.

This tool is generally L-shaped with, under normal conditions of use, a long thick horizontal arm 62 terminating, on the right-hand side as illustrated in the figures, in a shorter vertical arm 64 of smaller diameter, these two arms being connected by an inclined holder 66 secured by screws 67. The front external face of the intersection of the two arms has a recess 100, i.e. a groove of substantially rectangular cross-section that traverses the tool from one side to the other and that is also open in the front face.

Figure 3:
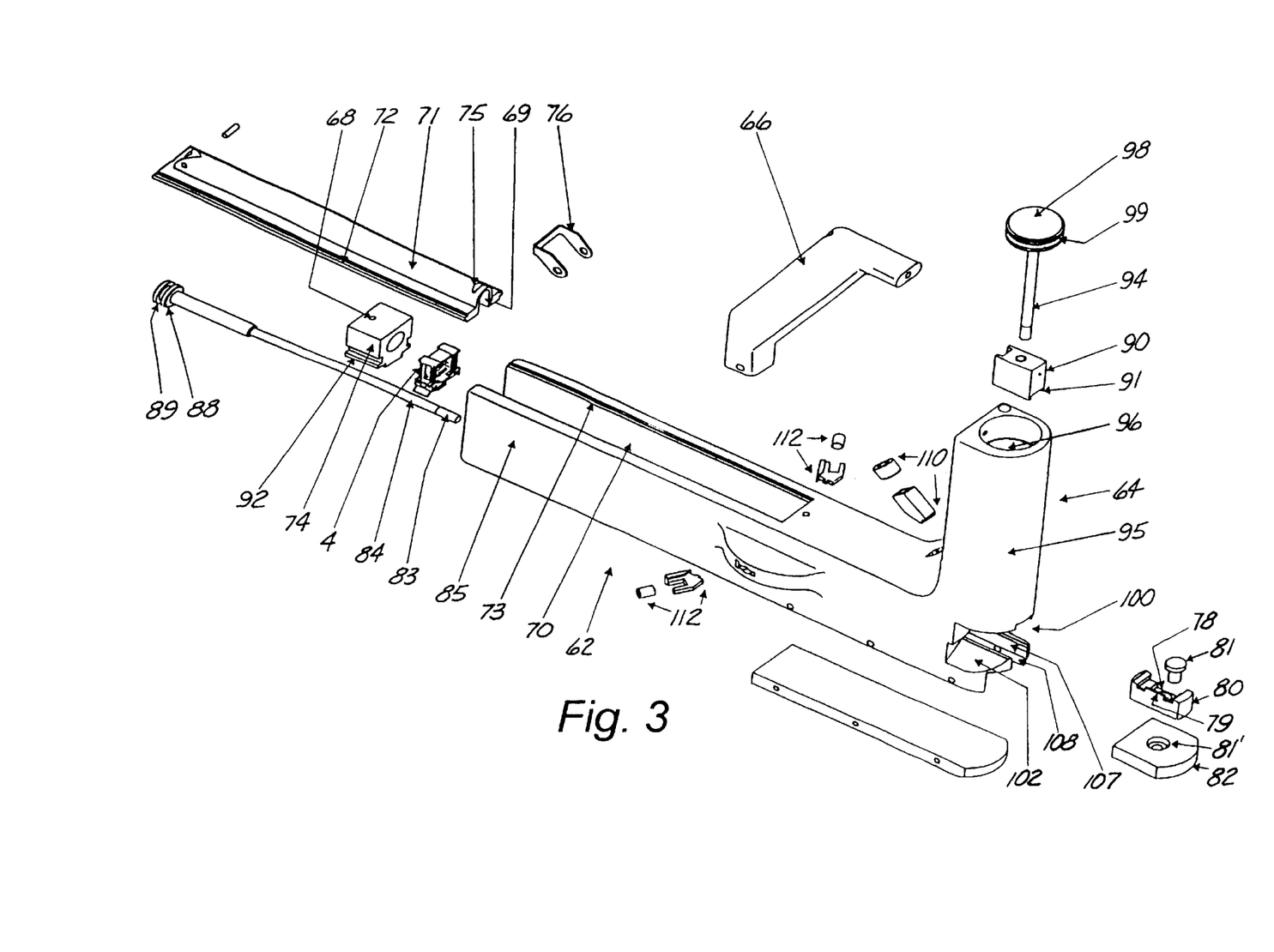
FIG. 3 is an exploded perspective view of certain units comprising a tool for installing fastening means according to FIGS. 1 and 2.
Figures 4A, 4C:
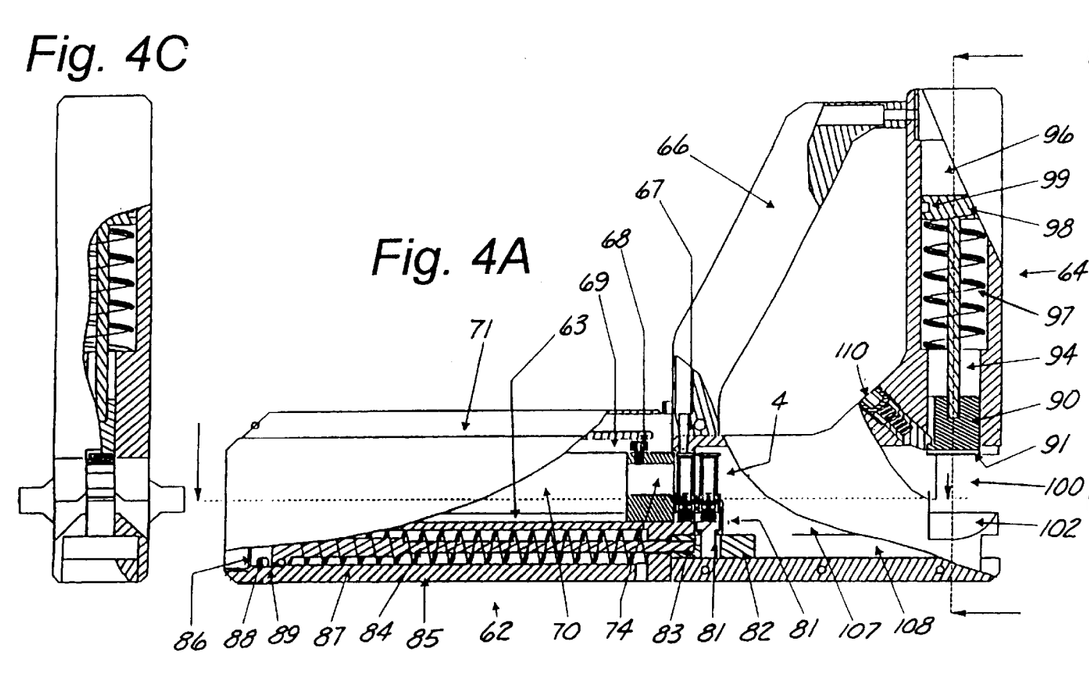
FIGS. 4A, 4B, 4C and 4D are plan and partial sectional views of the tool of FIG. 3 in the rest position, respectively from the side, rear, front and above.
Figure 4B:
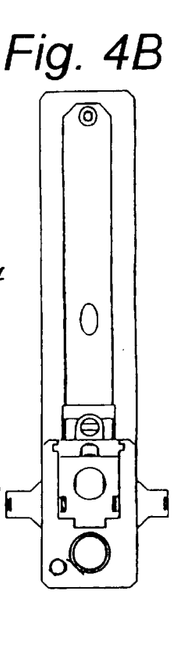
Figure 5A:
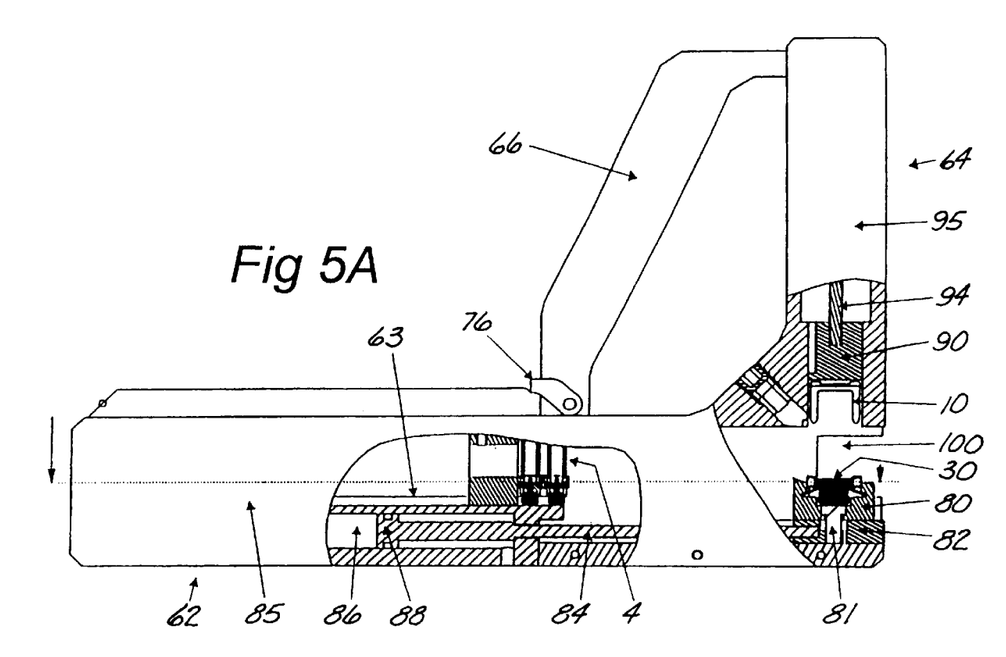
FIGS. 5A and 5B are plan and partial sectional views of the tool of FIG. 3 in the intermediate position corresponding to reception of a bundle of wires to be bound together, respectively from the side and from above.

As can be seen more clearly in FIGS. 3, 4A and 5A, the wide horizontal arm 62 comprises, in its upper part, a magazine 70 designed to contain installation devices 4 arranged side by side along a line perpendicular to the plane of their retainer. This magazine is accessible by releasing a cover 71 forming the upper face of the wide arm 62, this cover being held by two securement tongues 72 with a longitudinal lateral edge that engages in slides 73 provided in the upper edge of the lateral faces of this wide arm. This cover 71 is held in position by a small pivoting bar 76 mounted on the lower base of the holder 66 so as to engage in a slot 75 correspondingly provided in the front end of the cover 71, as can be seen more clearly in FIGS. 3 and 5A.

A pusher 74 slides in this magazine 70, the said pusher being guided on the one hand by its lateral studs 92 engaged in lower slides 63 of the magazine, and on the other hand by an upper screw 68 engaged in a longitudinal guide channel 69 formed in the centre of the cover 71, as can be seen more clearly in FIGS. 3 and 4A. A rear spring (not shown) forces this pusher forwardly so as to bring the installation devices 4 towards the outlet of the magazine 70, i.e. to the level of the lower securement of the holder 66.

As can be seen more clearly in FIGS. 3, 4A and 5A, the lower part of the wide horizontal arm 62 of the tool comprises a first pneumatic actuating device 85 that displaces a sliding shoulder 82 on which is pivotally mounted a transporting frame 80 of an installation device 4, from the outlet of the magazine to the recess 100.

This actuating device 85 comprises a piston 88 provided with a sealing gasket 89 sliding in a longitudinal cylindrical chamber 86, the said piston being extended forwardly by a rod 84 whose threaded end 83 engages in a rear tapping of the sliding shoulder 82. As can be seen more clearly in FIG. 4A, a spring 87 is arranged between the piston 88 and a constriction of the cylindrical chamber 86 situated at the level of the outlet of the magazine, this spring 87 forcing the piston 88, in the rest position, towards the left, i.e. in a direction that reduces the volume of the chamber 86.

This shoulder 82 carries a transporting frame 80 by means of a rotating elastic pivot 81. For example, the frame may be integral with the pivot 81 that is guided in a central opening of the shoulder, which pivot is connected to the shoulder by a concentric spiral spring and is housed in a circular recess 81' of the upper face of the shoulder. The top of the transporting frame 80 is at the level of the extension of the lower part of the magazine 70. More particularly according to the invention, this transporting frame has a front abutment 79 and, directly above the pivot 81, a seating 78 of the base 30 of an installation device 4, in particular a central seating for the fastening means 50 and two lateral slits receiving the skirt 48.

Figure 4D:
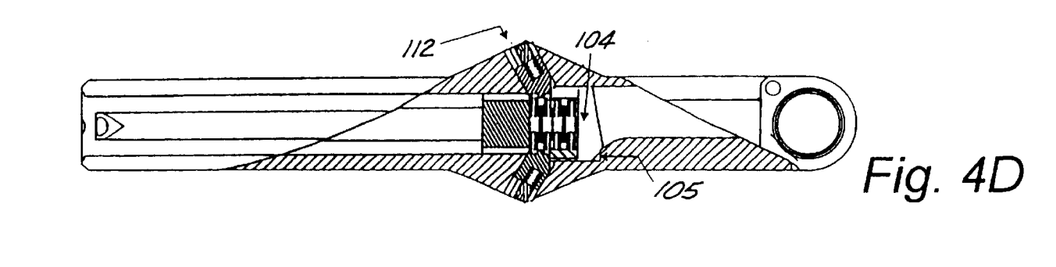
Figure 5B:
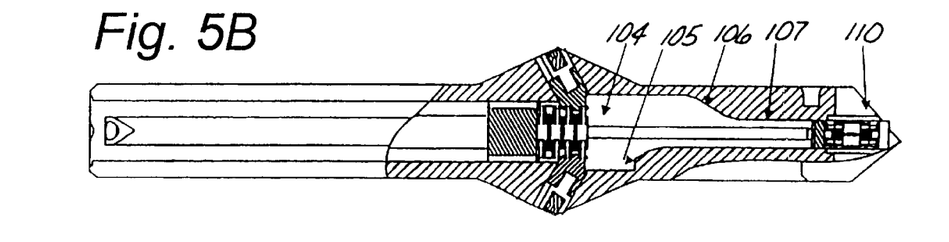

As can be seen more clearly in FIGS. 4D, 5B and in the lower right-hand part of FIG. 3, the shoulder 82 and its transporting frame 80 are designed so as to slide within a channel having, from the magazine 70 up to the recess 100, first of all a wide section 104 terminating in a projection 105 situated only at the level of the transporting frame 80, to which it imparts a rotation of a quarter of a turn, this rotation being guided by a second section 106 that narrows and terminates in an inverted T-shaped guide channel, that is to say comprises a lower horizontal guide channel 108 for the sliding shoulder 82 and a narrow vertical guide channel 107 of the transporting frame 80 as far as the recess 100 of the tool.

In addition, and as can be seen more clearly in FIGS. 4D, 5B and in the centre of FIG. 3, the outlet opening of the magazine 70 comprises two electromechanical catches 112 arranged opposite one another across the side wall of the large horizontal arm 62 of the tool, these catches retaining the first installation device 4 of the series contained in the magazine 70 all the while the transporting frame 70 has not returned to the level of this outlet opening.

As regards the short upper arm 64 of the tool, this contains a second pneumatic linear actuating device 95 consisting of a piston 98 together with a sealing gasket 99 sliding within a cylindrical vertical chamber 96, the lower face of this piston 98 being extended by a rod 94 whose end is integral with an operating unit 90. As shown in FIG. 4A, a spring 97 coaxial to the rod 94 acts between a lower constriction of the chamber 96 and the lower face of the piston 98 in order, in the rest state, to drive this piston upwardly in a direction reducing the volume of the chamber 96, i.e. by raising the operating unit 90 upwardly.

FIG. 4A shows how the operating unit 90 is held by an electromagnetic catch 110 at a first height in which longitudinal hooks 91 provided on the lower face of the said operating unit 90 are located at the level of the upper edge of the vertical guide duct 107 so as to receive the protuberances 16 of the bridge 12 of the retainer 10 of an installation device 4.

Figure 6A:
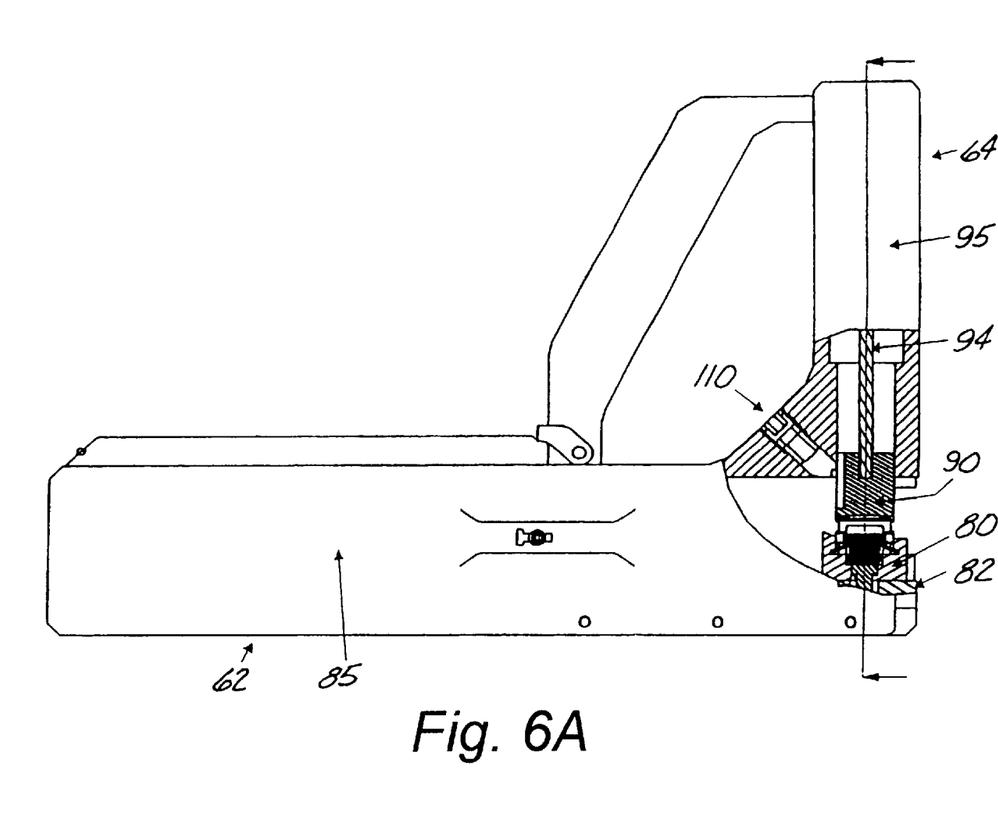
FIGS. 6A and 6B are plan and partial sectional views of the tool of FIG. 3 during the securement of a device on a bundle of wires, respectively from the side and front.
Figure 6B:
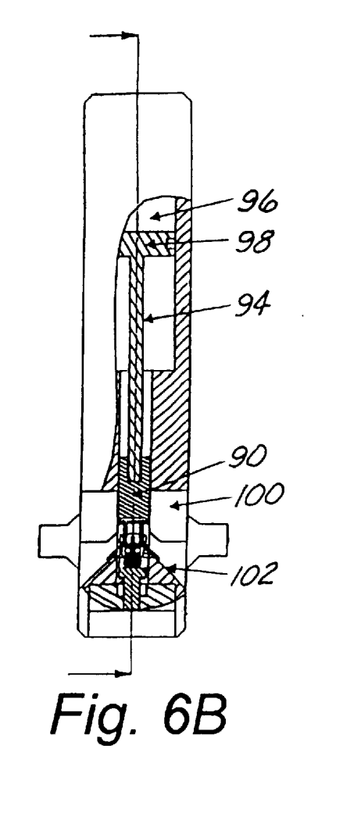

As can be seen more clearly in FIGS. 3 and 6B, the lower floor 102 of the recess 100 has a triangular apex section oriented upwardly in the direction of the operating unit 90.

The fastening means and tool described hereinbefore are used in the following way.

The installation device 4 according to the invention may first of all be used manually in the following manner. A right-handed user starts by taking a bundle of cables in his left hand, for example by gripping them between the palm and first three fingers of his hand, and using his thumb and left index finger to hold a base 30 against this bundle. Next, the user with his right hand passes a retainer 10 over the bundle so as to engage the arms 20, 24 in their inclined passage 42 corresponding to the base 30 and force them in until the notches 22, 24 lock in the respective hooks 44.

The installation of the devices 4 on a bundle is however found to be substantially facilitated by means of the tool according to FIGS. 3 to 6 that is specially provided according to the invention.

To this end, the operator inserts a plurality of devices 4 into the magazine 70 after having removed the cover 71 and pulled back the pusher 74. After the latter has been released it pushes the series of devices 4 until the first one engages in the transporting frame 80 situated in the first rear position as shown in FIG. 4A. The catches 112 are then locked in the second following fastening means. The operator next closes the cover 71 and primes the second electromagnetic catch 110 so as to hold the operating unit 90 of the second actuating device 95 at its first height position as shown in the same FIG. 4A. An installation cycle of the devices may then start.

By pressing a first trigger (not shown) preferably provided on the holder 66 (or by engaging this trigger in a first position), the operator releases the first actuating device 85, the effect of which is to push the piston 88 from the left to the right as shown in FIG. 4A to FIG. 5A.

This advance of the piston 88 also has the effect of entraining with it the sliding shoulder 82 and thus the transporting frame 80 in the channels 104–107. As may easily be understood by examining FIG. 5B, the transporting frame 80 first of all undergoes a forward translation along a transverse orientation until it strikes against the projection 105, where it undergoes a quarter of a turn around its elastic pivot 81 so as to continue its forward translation, it then being oriented in the longitudinal direction and guided by the vertical channel 107.

At the end of the travel of the piston 88 as shown in FIG. 5A, the sliding shoulder 82 and transporting frame 80 have then brought the installation device into the plane of the recess 100, the protuberances 16 of the bridge 12 of the retainer 10 then being inserted into the lower hooks 91 of the operating unit 90 situated at its first height.

The arrival of the sliding shoulder 82 and transporting frame 80 in the recess 100 is then detected for example by a micro-switch, which releases the electromechanical catch 110 and allows the operating unit 90 to be raised to its second height under the action of the spring 97 on the piston 98. The weak rupture points 28 between the retainer 10 and the base 30 are then broken, resulting in the separation of these two pieces as can be seen more clearly in the right-hand part of FIG. 5A.

In this position the bundle of cables may be accommodated in the recess 100 above the base 30.

The operator then actuates a second trigger (not shown) preferably also provided on the holder 66 (or engages the trigger in a second position) in order co release the second linear actuating device 95, thereby forcibly lowering the operating unit 90 to its third height and thus bringing the retainer 10 above the bundle until its arms penetrate and engage in their corresponding passage 42 as shown in FIG. 6A. The importance of the triangular base of the recess 100 should be noted, which ensures the spacing of the ends of the arms 20, 24 of the retainer 10 emerging from the lateral outlet openings 43 of the base 30.

The arrival in the low position of the operating unit 90 is itself detected for example by a micro-switch, which then closes the electromechanical catch 110.

When the operator actuates the second trigger (not shown), this releases the pressure prevailing in the chamber 96, enabling the spring 97 to push the piston 98 upwardly again i.e. to push the operating unit to its first height as shown in FIG. 4A. This spring 97 is sufficiently strong for the operating unit 90 holding the installation device 4 by the protuberances 16 of the bridge 12 of the retainer 10 to remove the base 30 from the transporting frame 80. The installation device 4 hooked around the bundle is then held only by the hooks 91 of the operating unit 90, which may simply be disengaged by withdrawing the tool rearwards.

By releasing the first trigger the pressure in the chamber 86 of the first actuating device 85 is then released, enabling the sliding shoulder 82 and the transporting frame 80, now empty, to retract rearwards under the force of the spring 87 acting on the piston 88. During the movement of the transporting frame 80 to the level of the projection 105, the elasticity of the pivot 81 exerts on the transporting frame 80 a rotation of a quarter of a turn in the reverse direction, bringing its orientation from a longitudinal return direction to the transverse direction so that it lies flush in the outlet opening of the chamber 70.

The arrival of the transporting frame 80 at the level of this magazine outlet is detected for example by micro-switches, which releases a pulse triggering a retraction and then a re-turn of the electromechanical catches 112. During this release pulse, the following installation device 4 contained in the magazine 70 is advanced by the pusher 74 into the transporting frame 80 until it comes to rest against the abutment 79 of this frame, the electromechanical catches 112 then closing on the following second device. The situation as shown in FIG. 4A is then restored, i.e. the whole arrangement is ready for a new cycle.

Provision may also be made for the cycle to be initiated only by a single starting pulse, a programmable automated unit calculating the time intervals and initiating the successive phases.

Figure 8:
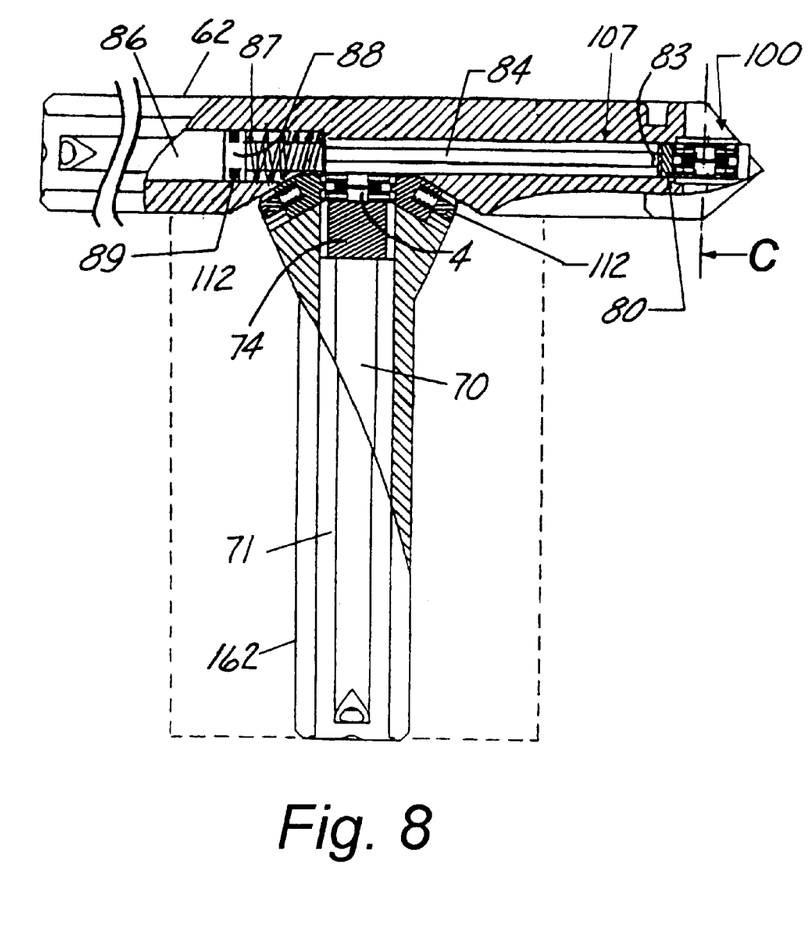
FIG. 8 shows a modification of the tool in a plan view from above and a partial sectional view corresponding to the sectional plane of the views from above of FIGS. 4D an 5B.

FIG. 8 shows a modification of the tool described hereinbefore. For the sake of clarity, the items common to the preceding embodiment and to this variant will be identified by means of the same reference numerals.

In this variant the tool comprises a third horizontal arm 162 adjacent perpendicularly to the horizontal arm 62. The tool retains, in the manner of the previous embodiment, the arrangement between the horizontal arm 62 and the shorter vertical arm of smaller diameter, these two arms being connected by the inclined holder. The tool also retains the structure of the vertical arm as has been described with the aid of FIGS. 3 to 6.

The structure of the third arm 162 is based on that of the upper part of the horizontal arm 62 in the previous embodiment. FIG. 8 shows the magazine 70 intended to contain the installation devices 4 arranged side by side along a line perpendicular to the plane of their retainer. This magazine is accessible by releasing the cover 71 forming an upper face of the third arm 162. The two longitudinal securement tongues 72 with a side edge, the lateral slides 73, and the small pivoting bar 76 engaging in the slit 75 are arranged in the manner described in FIGS. 3 and 5A. The same also applies to the pusher 74 sliding via its lateral studs 92 in the lower slides 63 and guided by the upper screw 68 engaged in the longitudinal guide channel 69. A rear spring forces this pusher forward so as to displace the installation devices 4 towards the outlet of the magazine 70, at the level of the right-angle securement of the two horizontal arms 62 and 162.

The two electromagnetic catches 112 are arranged in the outlet opening of the magazine 70, on both sides of the third arm 162 so as to retain the first installation device 4 of the series contained in the magazine 70.

The structure of the horizontal arm 62 is based on the structure of its lower part in the previous embodiment. Accordingly, the first pneumatic actuating device displaces the piston 88 provided with the sealing gasket 89 by sliding in the longitudinal cylindrical chamber 86. The piston 88 is extended forwardly by the rod 84 whose grooved end 83 engages in a rear tapping of the sliding shoulder. The spring 87 arranged between the piston 88 and a constriction in the cylindrical chamber 86 located at the level of the outlet of the magazine 70 pushes, in the rest position, the piston 88 in a direction that reduces the volume of the chamber 86.

The transporting frame 80 is firmly mounted on the sliding shoulder so as to be displaced with the latter in a channel parallel to the longitudinal direction of the arm 62. The channel has, up to the recess 100 of the tool, an inverted T-shaped cross-section comprising a lower horizontal guide channel for the sliding shoulder and a narrow vertical guide channel 107 for the transporting frame. The transporting frame 80 is secured to the shoulder in such a way that it extends parallel to the longitudinal direction of the arm 62. The frame has, as previously shown in FIG. 3, a front abutment 79 and a housing 78 for the base of an installation device, in particular a central housing for the fastening means and two lateral slits receiving the skirt.

At the intersection of the two horizontal arms 62 and 162, the magazine 70 terminates at a right angle in the channel of inverted T-shaped cross-section.

The use of the tool according to the modification starts with the same operation of loading the magazine 70 with installation devices 4. Under the action of the rear spring the pusher 74 displaces the said devices parallel to the longitudinal direction of the third arm 162 and perpendicularly to the planes of the retainers of the devices. At the outlet of the magazine 70 the first device of the series is received by the transporting frame 80 extending parallel to the longitudinal direction of the arm 62. The catches 112 are then engaged in the following fastening means.

The operator primes the second electromechanical catch 110, FIG. 4A, so as to hold the operating unit 90 of the second actuating device 95 at its first height, and then releases the first actuating device 85 in order to push, via the piston 88, FIG. 8, and the sliding shoulder, the transporting frame 80 in its guide channel 107. The installation device 4 received by the transporting frame 80 thus executes a second movement parallel to the longitudinal direction of the arm 62, from the outlet of the magazine 70 up the recess 100 of the vertical arm 64, where the protuberances of the bridge of the retainer, FIG. 5A, are inserted into the lower hooks of the operating unit located at its first height.

The following phases of the installation cycle of the device 4 are identical to those described for the previous embodiment of the tool.

According to this variant, the installation device executes a first movement in the magazine perpendicularly to the plane of its retainer, followed by a second movement in the channel accommodating the transporting frame, parallel to the plane of the said retainer. The right-angled arrangement of the magazine and of the transporting channel permits a direct transition between the two movements. In other words, the installation device does not undergo any rotation during the course of its transportation between the magazine and the recess of the tool.

This modification thus provides a simpler design of the tool, insofar as the pivoting-type mounting of the transporting frame on the shoulder is no longer necessary, and the guide channel 170 no longer includes a projection. In a similarly advantageous manner, the space occupied by the tool is reduced in the direction perpendicular to the cables, as symbolised by the letter C in FIG. 8

It is intended that the third arm 162 be situated in a horizontal plane situated below the horizontal plane containing the arm 62 accommodating the guide channel 107. In this case, these two arms are joined by an inclined ramp provided with a transporting channel for the displacement of the installation device from the outlet of the magazine 70 to the opening of the guide channel of the transporting frame.

In the variant that has just been described, the magazine arranged in the third arm 162 contains a single row of installation devices 4. A further advantage is conferred on the tool by providing it with a magazine consisting, according to FIG. 9, of a drum body 170 having on its periphery a plurality of longitudinal grooves 172 in which are inserted the installation devices 4. In this way the operational independence of the tool is increased in terms of the number of installation devices in reserve.

FIG. 8, which corresponds to the tool under conditions of use, shows in dotted lines the position of the drum or of a protective casing of the drum. The radial and axial positioning of the drum in the third arm is ensured by ball-and-spring type pushers, while the rotation around an axial direction perpendicular to the guide channel 107 is effected by means of a pneumatic actuating device acting on a reduction gear train. A rodless jack, fixedly mounted in the tool, enables the installation devices inserted in that one of the grooves that opens out in the guide channel 107 to be displaced after a rotation of the drum. The said drum can be retracted in order to permit a rapid loading of the installation devices. Provision is made for disengagement of the second arm 62 in order to permit access to the electromagnetic catches 112.

Provision is made to use the tool secured to a cable board. The cable bundle is built up step by step, by arranging cables underneath the recess of the tool in order to assemble them by means of the installation device. Several tools may be secured to the cable board, a board edge pulse triggering the action of all the tools simultaneously. In this procedure, several installation devices are secured simultaneously to the cable bundle. In this way the ergonomics of a cabling post can be increased and the assembly time of a bundle can be reduced.

As may be seen on reading the above description, the installation device 4 according to the invention is particularly easy to install above an electrical cable bundle by means of the tool specially provided for this purpose, by employing an external energy source, in particular pneumatic energy. The operator may thus concentrate exclusively on the accurate positioning of these installation devices along the bundle.

In addition, once the installation device has been mounted on the bundle it exhibits not only a simple fastening means 50 for securement to the panel, but also an elastic skirt 48 and four arm ends as can be seen more clearly in FIG. 2C, as a result of which this device is found to be particularly stable once it is installed on a panel.

As can be seen in FIG. 1A–1F, the structure of the installation device 4 means that it is particularly easy to manufacture by injecting plastics material into a mould, in particular with the retainer 10 initially integral with the base 30 via simple rupture points 28, thus facilitating storage and transportation.

Figure 9:
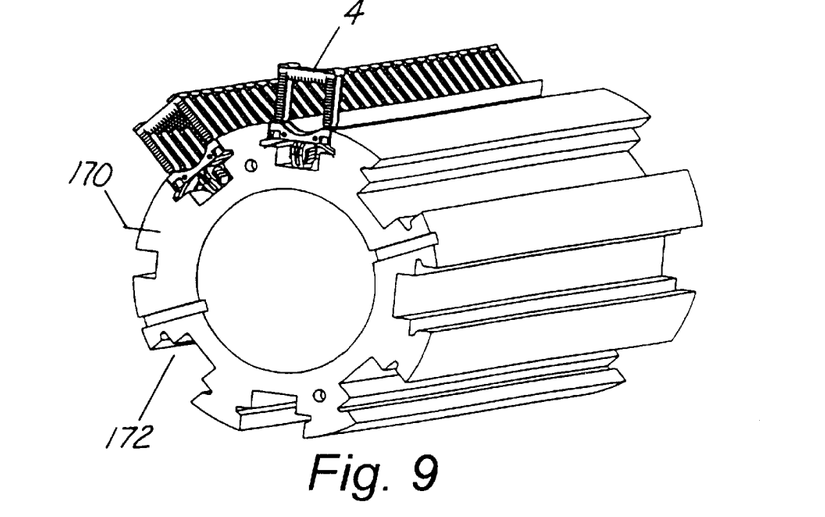
FIG. 9 is perspective view of a drum forming a multiple row magazine for installation devices.
Figure 10A:
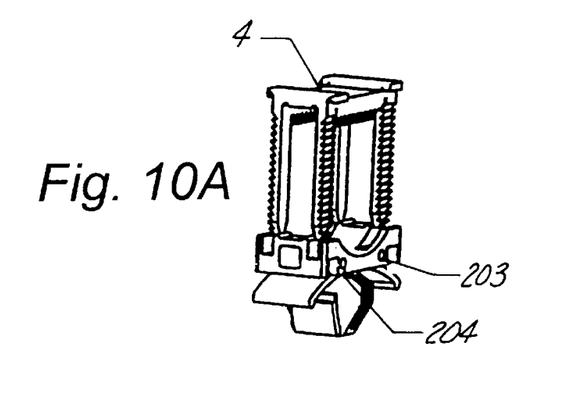
FIGS. 10A and 10B are perspective views of an installation device provided with studs and assembly openings.
Figure 10B:
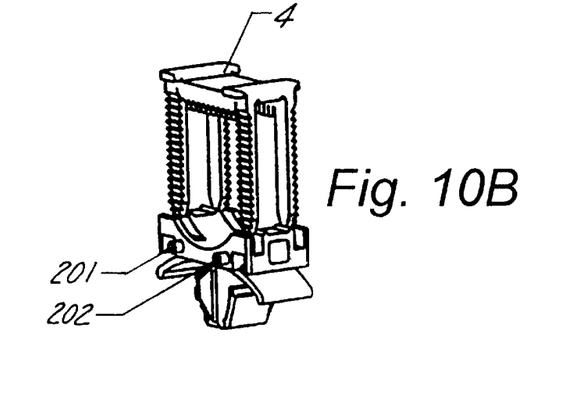

Moreover, provision may be made to arrange a pair of studs on the front face of the base that engage in a pair of corresponding openings provided in the rear face corresponding to the following installation device. As shown in FIGS. 10A and 10B, two studs 201 and 202 are secured to a face of the base and project perpendicularly to the plane of the retainer so that they can be inserted into two openings 203 and 204 formed on an opposite face of the base. On both sides of the base, the stud and opening 201 and 203 and respectively 202 and 204 are coaxial, and the two studs as well as the two openings are coplanar in a plane perpendicular to the plane of the retainer. This coupling by means of studs and openings enables a plurality of installation devices to be preassembled one behind the other in the form of a small bar of devices. As can be seen in FIG. 9, the bar 200 is installed in one piece in the grooves 172 of the body of the drum 170 forming the magazine of the tool. The electromechanical catches then effect a mechanical separation of the device situated in the opening of the magazine while the transporting frame executes a feed and withdrawal cycle.

Numerous improvements may be incorporated in this fastening means and its installation tool within the scope of the claims.

What is claimed is:

1. Installation device for installing one or more longitudinally extending elements on a panel, comprising:
   a U-shaped retainer disposed to surround transversely longitudinally extending elements, having flexible arms each provided with a series of notches;
   a base having, corresponding to each said arm, an inclined traversing passage whose inlet opening is located in the face opposite the retainer and whose outlet opening is located in a lateral face of the base, each said passage of the base having a retaining hook for the notches of the corresponding arm of the retainer, each flexible arm engaging in each corresponding inclined traversing passage until the notches lock in the respective hooks of the respective passages to secure the longitudinally extending elements to the base; and
   a fastening means for securing the base in an opening in the panel on the face of the base opposite to that facing the retainer.

2. The installation device according to claim 1, wherein the notches are carried on one of an external face of the flexible arms, where they are oriented outwardly with respect to the retainer.

3. The installation device according to claim 1, wherein the notches are carried on one of an internal face, an internal section and an external section of the flexible arms.

4. The installation device according to claim 1 wherein the retainer is initially connected to the base by weak rupture points.

5. The installation device according to claim 1 wherein the retainer has two pairs of said flexible arms, each said pair securing said longitudinally extending elements to the base on each side of said elements and wherein notches are oriented outwardly or inwardly with respect to the retainer and parallel or perpendicular to said elements.

6. The installation device according to claim 1 wherein the fastening means is hooked in a detachable manner to the base.

7. The installation device according to claim 1 wherein the fastening means for securing the base in the opening in the panel is in the form of a central pin provided with inclined tongues oriented towards the base, these tongues either being distributed in several longitudinal series distributed uniformly around the periphery of the pin, or each tongue surrounding the pin.

8. The installation device according to claim 7, characterized in that the base has an elastic skirt disposed where the base joins the fastening means and curved in the direction of the fastening means.

9. The installation device according to claim 1 wherein the base comprises studs to assemble the installation device on another, first installation device, and in that openings are provided in the base to assemble the device on another, second installation device.

10. Small bar of installation devices according to claim 9 wherein two successive devices are assembled by inserting the studs of one of the two devices into the openings of the other device.

11. Tool specially designed for an installation device according to claim 1 to be mounted on a bundle of longitudinally extending elements, comprising:
    a magazine enabling a plurality of devices to be stored;
    a transporting frame capable of being displaced by a first actuating device from a first position at the outlet of the magazine in order to transfer a base of a device to a second position so as to bring the said device into a plane of a recess provided in the front edge of the tool where a U-shaped retainer of the said device is held in an operating unit situated at a first height, followed by return; and
    a second actuating device enabling the operating unit to be raised perpendicularly to the base to a second height in order to separate the U-shaped retainer of the base, then, once the longitudinally extending elements are present above the base in the plane of the recess, enabling the operating unit to be lowered to a third height in order to insert flexible arms of the U-shaped retainer above the longitudinally extending elements into their corresponding passage in the base and then enabling the operating unit to be raised again to the first height in order to withdraw the base of the device from the transporting frame, the device then being able to be removed from the operating unit.

12. The tool according to claim 11, wherein the first actuating device is a single-chamber pneumatic linear jack with a spring that pushes a piston in a rest state to a position corresponding to a reduction in the chamber, thereby bringing the transporting frame integral with the end of a rod of the piston into its first position.

13. The tool according to claim 11 wherein the second actuating device is a single-chamber pneumatic linear jack with a spring pushing a piston in a rest state into a high position corresponding to a reduction in the chamber, thereby bringing the operating unit integral with the end of a rod of the piston into a second position, this operating unit being held initially in the first position against the force of the spring by an electromagnetic catch.

14. The tool according to claim 11 wherein the transporting frame is mounted on the end of the rod of the actuating device via a rotating pivot, and in that a duct within which the transporting frame is displaced has, starting from the magazine, a first wide part terminating in a projection that imparts to the transporting frame holding a device, a rotation of a quarter of a turn, followed by a second part for guiding the end of the rotation, followed in turn by a third channel for guiding the frame up to a plane of a recess of the front edge of the tool.

15. The tool according to claim 14 wherein the outlet opening of the magazine is provided with two oppositely facing electromechanical catches that engage in cavities of side faces of the base of the installation device so as to hold the latter at the level of this opening when the transporting frame is outside its first position.

16. The tool according to claim 11 wherein the magazine is provided with a pusher in order to displace the installation devices in a direction perpendicular to the retainers, as far as a guide channel that extends perpendicularly to the pusher, where an installation device is grasped parallel to the retainer by the transporting frame in order to be displaced towards the plane recess by sliding movement of the transporting frame and of the device within the guide channel.

17. The tool according to claim 16 wherein the magazine comprises a drum body that can turn about an axis of rotation perpendicular to the guide channel and that is provided with grooves parallel to the axis, in which are inserted installation devices to be pushed by an actuating device securely mounted in the tool, when one of the grooves is aligned with the guide channel after a rotation of the drum.

18. The tool according to claim 11 wherein a floor of the plane of the recess of the tool is of a convex triangular shape, the base of an installation device being brought and positioned by the transporting frame at the apex of the triangle.

* * * * *